US008050280B2

(12) United States Patent
Choi et al.

(10) Patent No.: US 8,050,280 B2
(45) Date of Patent: Nov. 1, 2011

(54) EFFICIENT SWITCHING DEVICE AND METHOD FOR FABRICATING THE SAME USING MULTIPLE SHARED MEMORIES

(75) Inventors: Ick-Sung Choi, Daejon (KR);
Jeong-Hee Lee, Daejon (KR);
Dae-Geun Park, Daegu (KR);
Hyoung-Il Lee, Daejon (KR);
Jong-Moo Sohn, Daejon (KR);
Seung-Woo Lee, Seoul (KR);
Bhum-Cheol Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1500 days.

(21) Appl. No.: 11/292,983

(22) Filed: Dec. 1, 2005

(65) Prior Publication Data

US 2006/0146851 A1    Jul. 6, 2006

(30) Foreign Application Priority Data

Dec. 2, 2004 (KR) .......................... 10-2004-0100651
Mar. 15, 2005 (KR) .......................... 10-2005-0021413

(51) Int. Cl.
*H04L 12/56* (2006.01)

(52) U.S. Cl. ..................................... 370/395.7; 370/412
(58) Field of Classification Search .............. 370/395.72
See application file for complete search history.

(56) References Cited

U.S. PATENT DOCUMENTS

| 5,127,000 | A | * | 6/1992 | Henrion ....................... 370/394 |
| 5,805,589 | A | * | 9/1998 | Hochschild et al. .......... 370/389 |
| 5,859,849 | A | * | 1/1999 | Parks ........................ 370/395.72 |
| 5,905,725 | A | * | 5/1999 | Sindhu et al. ................. 370/389 |
| 6,535,516 | B1 | * | 3/2003 | Leu et al. ................ 370/395.72 |
| 6,614,808 | B1 | | 9/2003 | Gopalakrishna |
| 6,647,017 | B1 | * | 11/2003 | Heiman ........................ 370/412 |

(Continued)

FOREIGN PATENT DOCUMENTS

JP        2002-141948 A        5/2002

(Continued)

OTHER PUBLICATIONS

Funkhouser, T.A., "RING: A Client-Server System for Multi-User Virtual Environments," Proceedings of the 1995 Symposium on Interactive 3D Graphics (Apr. 1995) pp. 85-92.

(Continued)

*Primary Examiner* — Daniel J Ryman
*Assistant Examiner* — Brian Roberts
(74) *Attorney, Agent, or Firm* — Blakely, Sokoloff, Taylor & Zafman

(57) ABSTRACT

An efficient switching device and a method for fabricating the same using multiple shared memories are provided. The switching device includes: an output time determination unit to determine an output time to an output port; an output time administration unit to administer a possible data output time for each output port; a memory bank selection unit to select a memory bank with an empty data output time position; a memory bank utilization information administration unit to administer utilization information per output time; a connection unit to deliver transmission data to an output time position; a shared memory unit to store the data in the output time position, to administer dispersed shared memory banks according to an output time, and to read and output transmission data; and an output port connection unit receiving output data to read and transmit output port information of the data to a corresponding output port.

15 Claims, 13 Drawing Sheets

U.S. PATENT DOCUMENTS

| | | | |
|---|---|---|---|
| 6,728,256 B1* | 4/2004 | Henrion | 370/429 |
| 7,295,553 B2* | 11/2007 | Saitoh | 370/392 |
| 2002/0126673 A1* | 9/2002 | Dagli et al. | 370/392 |
| 2003/0108056 A1* | 6/2003 | Sindhu et al. | 370/401 |
| 2004/0081184 A1* | 4/2004 | Magill et al. | 370/413 |

FOREIGN PATENT DOCUMENTS

| | | |
|---|---|---|
| KR | 10-2002-0049359 A | 6/2002 |
| KR | 10-2003-0054664 A | 7/2003 |
| WO | WO 99/07181 A2 | 2/1999 |

OTHER PUBLICATIONS

Sundar Iyer et al., "Routers With a Single Stage of Buffering", SIGCOMM '02, Aug. 19-23, 2001, Pittsburgh, Pennsylvania, USA Computer Systems Laboratory, Stanford University (14 pp).

* cited by examiner

FIG. 5A

OUTPUT TIMES FOR DETERMINING DATA OUTPUT TIME FROM OUTPUT
PORT OF TRANSMISSION DATA [OUTPUT PORT INDEX]

| OUTPUT PORT 1 | OUTPUT PORT 1 | .... | OUTPUT PORT M | 500 |
|---|---|---|---|---|
| OUTPUT TIME OF TRANSMISSION DATA TO OUTPUT PORT 1 | OUTPUT TIME OF TRANSMISSION DATA TO OUTPUT PORT 2 | | OUTPUT TIME OF TRANSMISSION DATA TO OUTPUT PORT (M-1) | OUTPUT TIME OF TRANSMISSION DATA TO OUTPUT PORT M |

FIG. 5B

INPUT PORT SERVICE PRIORITY INFORMATION FOR EACH
OUTPUT PORT FOR DETERMINING THE ORDER OF INPUT PORT SERVICE
OF DATA HEADING TO AN IDENTICAL OUTPUT PORT [OUTPUT PORT INDEX]

| OUTPUT PORT 1 | OUTPUT PORT 2 | .... | OUTPUT PORT M | 510 |
|---|---|---|---|---|
| INPUT PORT SERVICE PRIORITY INFORMATION | INPUT PORT SERVICE PRIORITY INFORMATION | | INPUT PORT SERVICE PRIORITY INFORMATION | INPUT PORT SERVICE PRIORITY INFORMATION |

FIG. 7

MEMORY BANK STATE TABLE [OUTPUT TIME][MEMORY BANK]

MEMORY BANK NUMBER 1   2   ...   ...   (R-1)   R

OUTPUT TIME

1

2

TRANSMISSION DATA OUTPUT TIME → i

...

Q

UTILIZATION INFORMATION (USED OR EMPTY)

FIG. 8

MEMORY BANK UTILIZATION STATE TABLE [INPUT PORT][MEMORY BANK]

MEMORY BANK NUMBER
1    2    ...         ...    (R-1)    R

OUTPUT TIME OF
INPUT PORT 1 DATA — 800

OUTPUT TIME OF
INPUT PORT 2 DATA

...

OUTPUT TIME OF
INPUT PORT N DATA

UTILIZATION INFORMATION (USED OR EMPTY)

FIG. 10
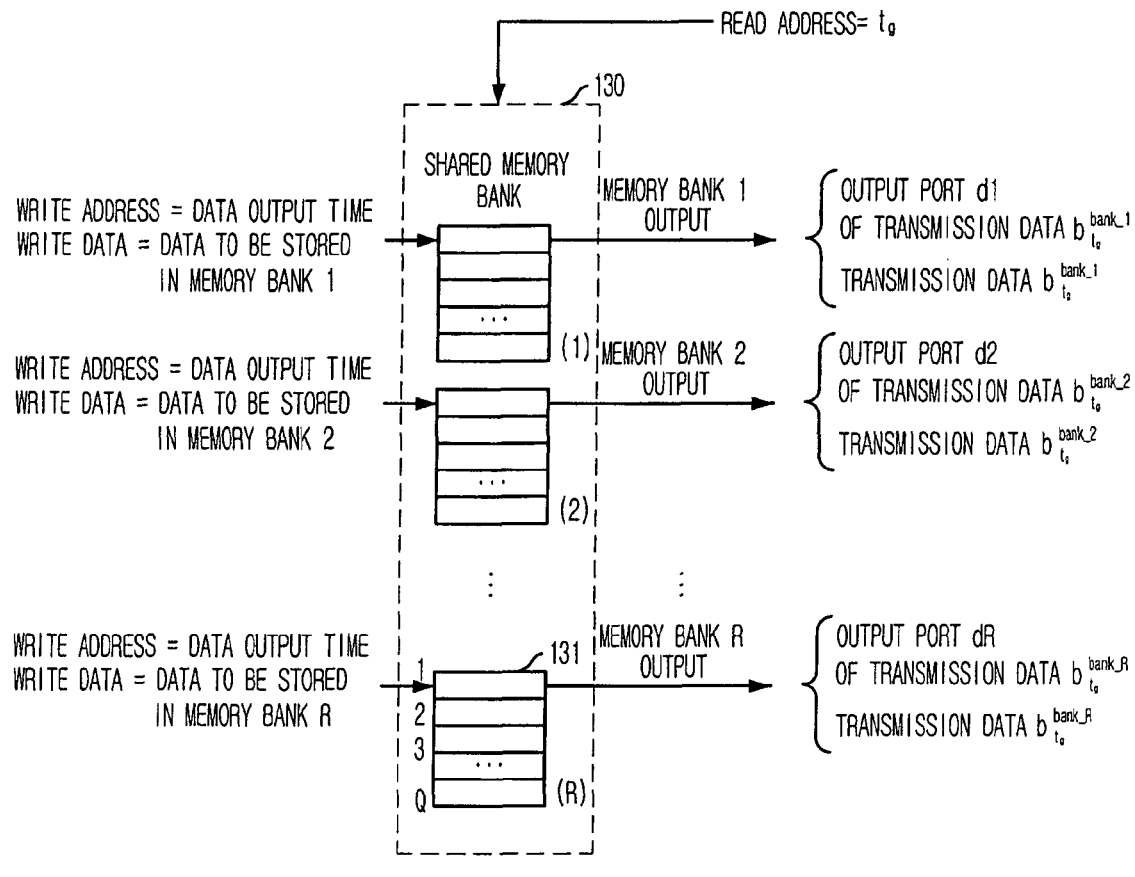
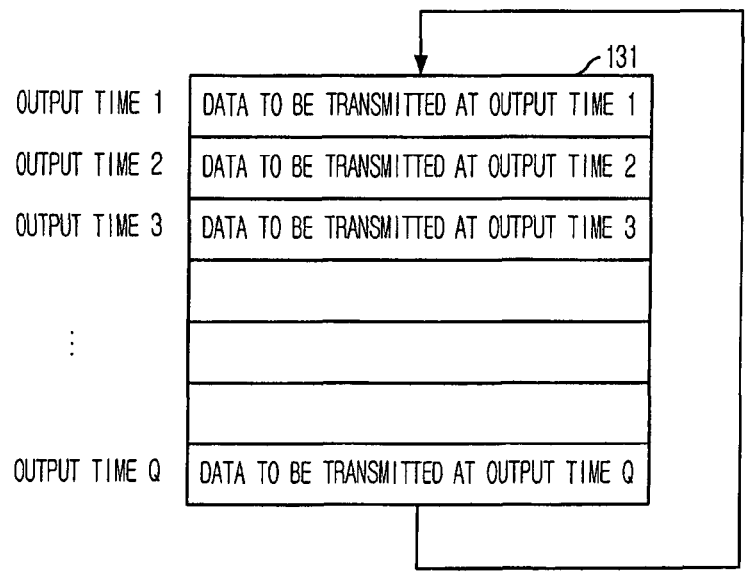

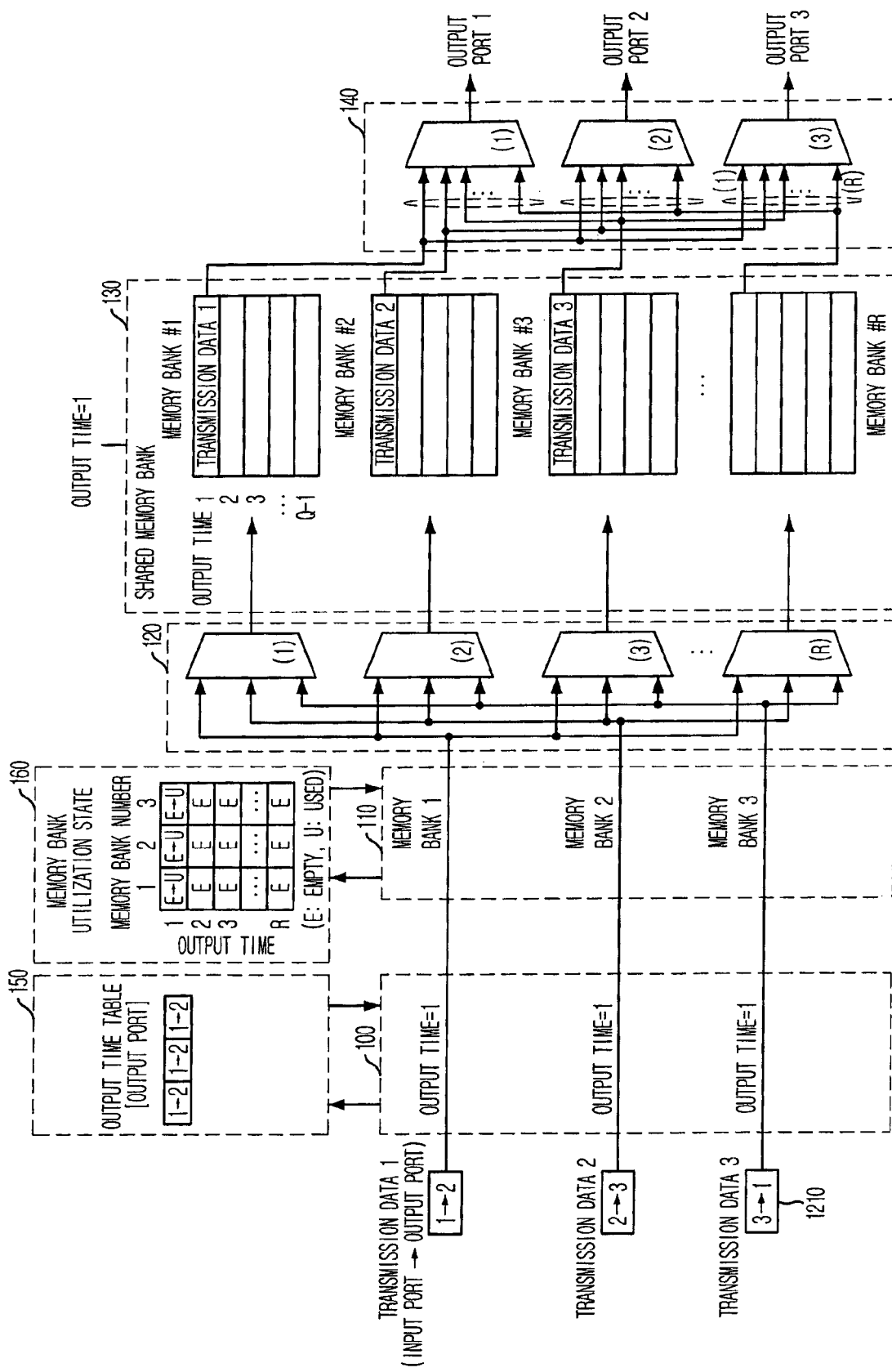

EFFICIENT SWITCHING DEVICE AND METHOD FOR FABRICATING THE SAME USING MULTIPLE SHARED MEMORIES

FIELD OF THE INVENTION

The present invention relates to a switching device having a cell/packet switching function and a method for fabricating the same to prevent collisions of input/output ports in a switching system or a network system; and, more particularly, to a switching device and a method which: shares multiple memory banks to enable easy expansion; reduces power consumption by storing the cell/packet once in a memory bank before outputting the cell/packet; and provides identical performances as an output-queue switch structure for uniform distribution traffic and non-uniform distribution traffic.

DESCRIPTION OF RELATED ARTS

Presently, the public interest is increasing towards various services such as electronic commercial transactions by the internet, internet broadcastings such as moving picture services, teleconferences, distance educations, home-shopping channels, on-line real-time games, and home networks. Thus, to provide the users with broader bandwidth, active research had been made to embody an economical switching system having broader bandwidth.

Traffic to be inputted into a switching system can be modeled as uniform distribution traffic and non-uniform distribution traffic according to a distribution of a cell/packet which arrives in each port. Most of the current switch structures provide good performances for the uniform distribution traffic.

On the other hand, an input-queue switch structure, a multiple channel switching method using multiple switching planes, an input-queue switch structure using scheduling methods such as a longest queue first (LQF) and an oldest cell first (OCF), parallel shared memories and distributed shared memory banks are being used to improve the performances for the non-uniform distribution traffic. However, the performance improvement methods for the non-uniform distribution traffic result in high overhead costs.

For example, with a reference to the article "Routers with single stage of buffering" in the "Sigcomm 2002" published in August, 2002 by Sundar Iyer, Rui Zhang and Nick McKeown, there are dispersed memory banks in each line card with a cross-bar or a connection bus. An inputted transmission data is stored twice in the dispersed memory banks in each of the line cards, that is, the inputted transmission data goes through a process of: the dispersed memory banks in a line card→a switch→the dispersed memory banks in the line card, and then the transmission data is outputted. Also, a connection capacity between the line card and the memory banks is three to four times larger than the entire line card capacity.

At this point, the memory banks and bandwidth of a connection signal in use are the most influencing design specifications when expanding a system capacity and performances. Also, it is possible to fabricate an economical switching system by using cheaper low-speed memory banks and link bandwidth. For a high-performance and high-capacity switching system, fabrication cost for expanding a capacity and performances increases because the switching system uses devices on the cutting edge of technology. The needed capacity of memory banks to transmit data in a switching system can be simply estimated as "input/output bandwidth of a device"*"latency of the device." At this time, the number of memory banks, the size of the region and the level of power consumption necessary for the embodiment increase in a case where a delivery time of transmission data lengthens or the transmission data are stored multiple times, or in a case where a latency period through the device increases.

Conventional technologies use memory banks or connection structures with input/output bandwidth which is multiple times larger than input/output link bandwidth, to provide the performances of an output-queue switch structure. The conventional technologies for providing performances of an output-queue switch structure usually stores transmission data twice or more in memory banks before outputting. It is disadvantageous with larger bandwidth of the memory banks and higher consumption of memory bank capacity and power when compared with a structure where most of the data are stored once.

SUMMARY OF THE INVENTION

It is, therefore, an object of the present invention to provide a switching device and a method for fabricating the same using multiple shared memory banks capable of providing the performances of an output-queue switch structure for uniform distribution traffic as well as non-uniform distribution traffic.

That is, the object of the present invention is to provide the switching device and the method for fabricating the same which shares multiple memory banks to enable easy expansion, reduces power consumption by storing once in a memory bank before outputting and provides identical performances as an output-queue switch structure for uniform distribution traffic and non-uniform distribution traffic.

In accordance with an aspect of the present invention, there is provided a switching device for delivering inputted data in a plurality of input ports to a plurality of output ports, including: an output time determination unit to determine an output time to an output port by reading an output port of an input data from an external device; an output time administration unit which is connected to the output time determination unit to administer a possible data output time for each output port of the data; a memory bank selection unit to select a memory bank with an empty data output time position by utilizing a data output time from the output time determination unit; a memory bank utilization information administration unit which is connected to the memory bank selection unit to administer utilization information per output time of the memory bank; a connection unit to deliver transmission data to an output time position of the memory bank which is selected and determined by results of the output time determination unit and the memory bank selection unit; a shared memory unit which is connected to the connection unit to store the data in the output time position of the memory bank selected and determined by results of the output time determination unit and the memory bank selection unit, to administer a plurality of dispersed shared memory banks according to an output time ($t^{input\_port}$) to read and output transmission data which correspond to a current output time ($t_g$); and an output port connection unit receiving output data which correspond to the current output time ($t_g$) of the shared memory unit to read output port information of the data and transmit the read output port information to a corresponding output port.

In accordance with another aspect of the present invention, there is provided a switching method for delivering data which are inputted through a plurality of input ports to a plurality of output ports, including: reading output ports of transmission data inputted through input ports to determine data output times to output ports; selecting memory banks with empty data output time positions by utilizing the determined data output times; storing the transmission data in the selected and determined memory banks and output time positions; reading and delivering the transmission data of the memory banks which correspond to a current output time ($t_g$); and receiving output data which correspond to the current output time ($t_g$) and reading output port information of the data for outputting to a corresponding output port.

BRIEF DESCRIPTION OF THE DRAWINGS

The above and other objects and features of the present invention will become better understood with respect to the following description of the specific embodiments given in conjunction with the accompanying drawings, in which:

FIGS. 5A to 5B are diagrams showing embodiments of possible data output time information for each output port of the data used in an output time administration unit for each output port;

FIG. 7 is a diagram showing an embodied memory bank state table (providing memory banks and utilization information per output time of a shared memory bank) which is used in a memory bank utilization information administration unit;

FIG. 8 is a diagram showing an embodiment of memory bank utilization information per output time for input port data which are used in a memory bank selection unit;

FIG. 10 is a detailed diagram showing embodiments of an entire shared memory bank and an individual memory bank;

FIG. 12 is a diagram showing an entire operation process of a switching device in accordance with an embodiment of the present invention.

DETAILED DESCRIPTION OF THE INVENTION

An efficient switching device and a method for fabricating the same using a multiple shared memory in accordance with a specific embodiment of the present invention will be described in detail with reference to the accompanying drawings, which is set forth hereinafter.

Figure 1:
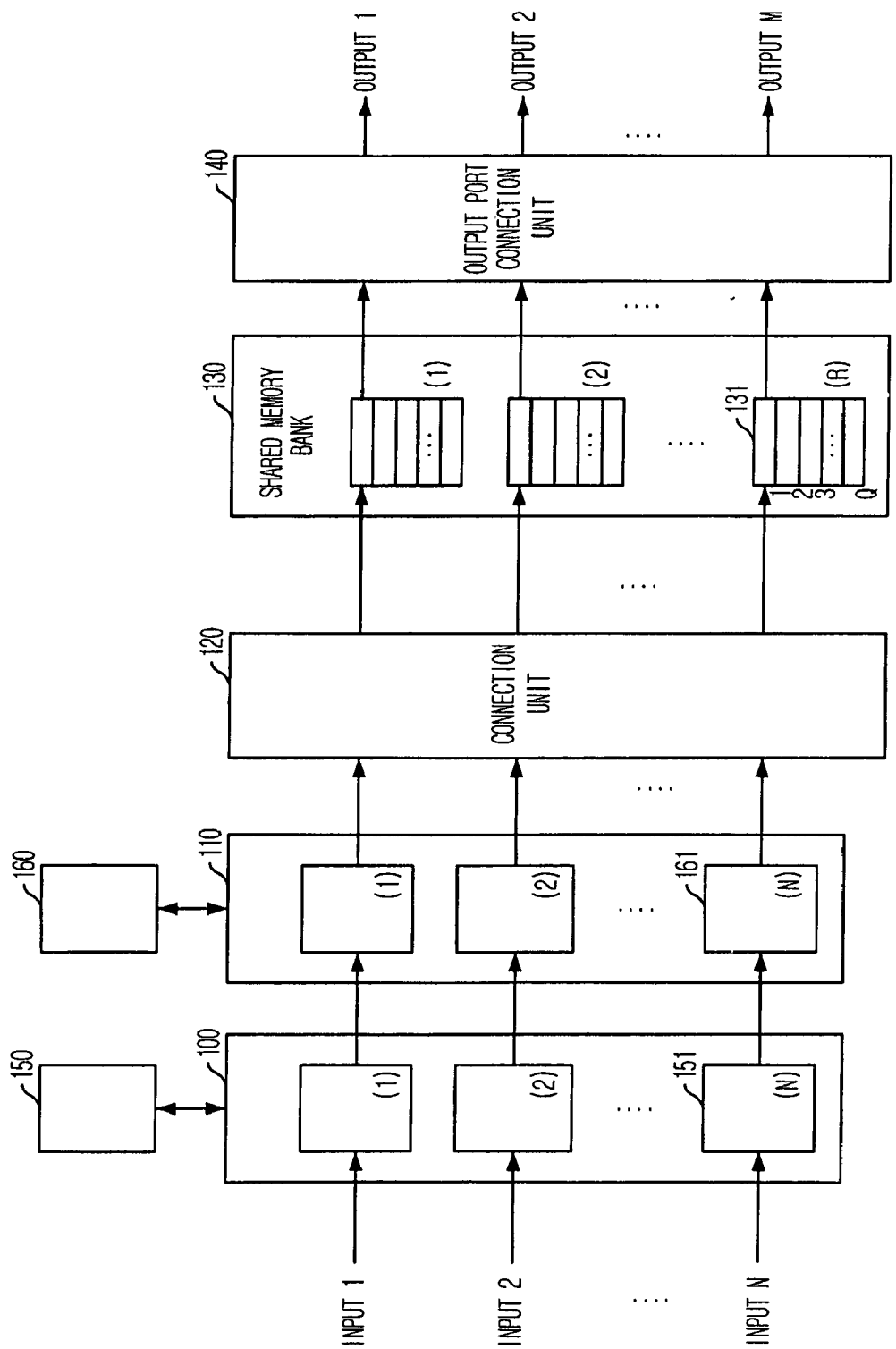
FIG. 1 is a diagram illustrating an efficient switching device using a multiple shared memory bank in accordance with a specific embodiment of the present invention.

FIG. 1 is a diagram illustrating an efficient switching device using a multiple shared memory bank in accordance with a specific embodiment of the present invention, and the switching device delivers data inputted from N number of channels to M number of output channels.

Figure 2:
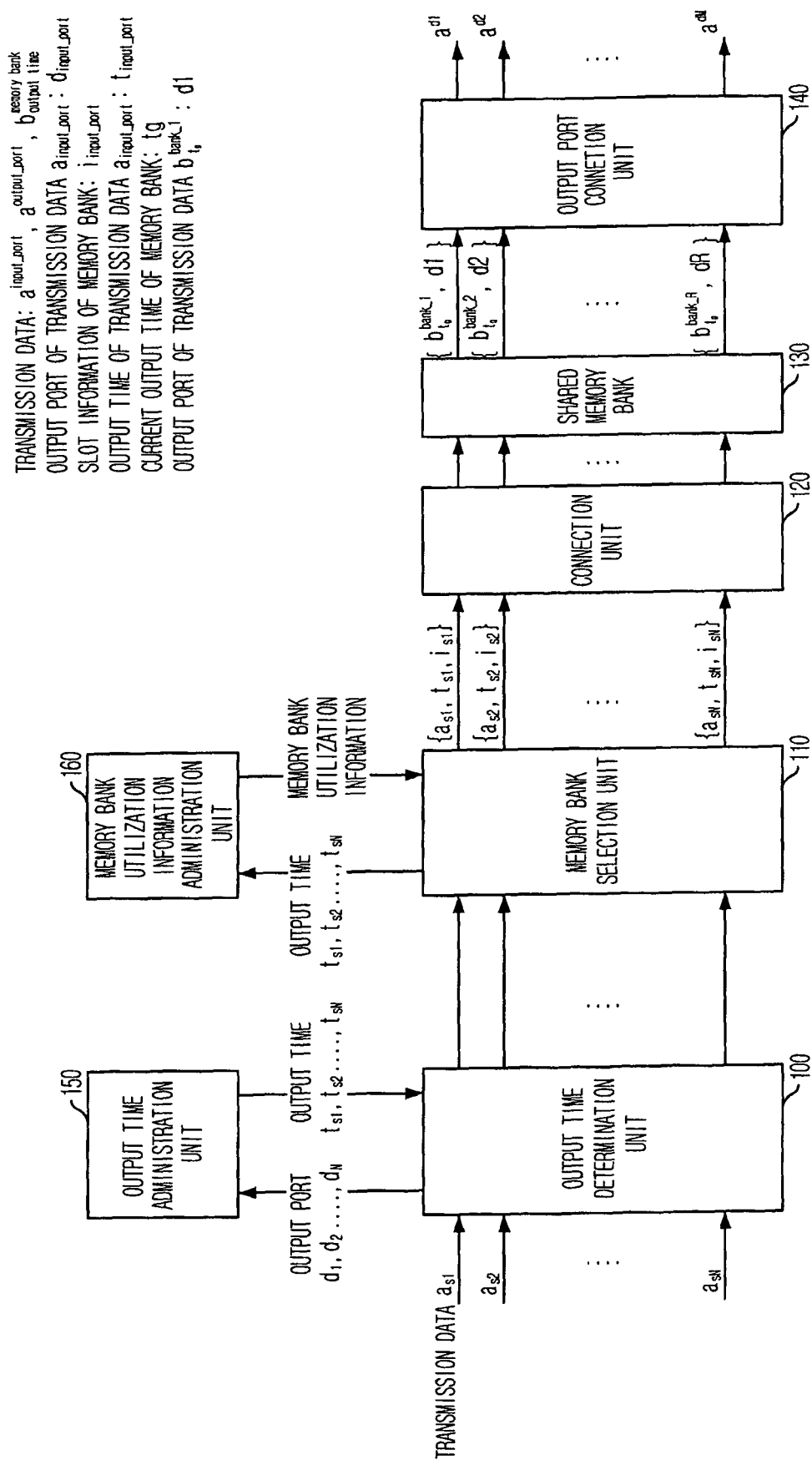
FIG. 2 is a detailed diagram illustrating internal connections and switching information of a switching device in accordance with another specific embodiment of the present invention.

As shown in FIG. 1, the switching device using a multiple shared memory bank includes: an output time determination unit 100 which reads output ports of transmission data (cell/packet) inputted from external devices and determines output times to the output ports; an output time administration unit 150 which is connected to the output time determination unit 100 to administer possible data output times per output port of the transmission data; a memory bank selection unit 110 which selects memory banks 131 with empty data output time positions by utilizing the data output times which are the determination results of the output time determination unit 100; a memory bank utilization information administration unit 160 which is connected to the memory bank selection unit 110 to administer memory bank utilization information per output time; a connection unit 120 which delivers the transmission data to the output time positions of the memory banks 131 which are determined and selected by the output time determination unit 100 and the memory bank selection unit 110 respectively; a shared memory bank 130 which is connected to the connection unit 120 to store the data in the output time positions of the memory banks 131 which are determined and selected by the output time determination unit 100 and the memory bank selection unit 110 respectively, to administer the multiple dispersed shared memory banks 131 by output times $t^{input\_port}$, as shown in FIG. 2, and to simultaneously read the transmission data of the memory banks 131 corresponding to a current output time $t_g$ for outputting; and an output port connection unit 140 which receives the output data corresponding to the current output time $t_g$ from the shared memory bank 130 to read the output port information of the data for delivering to the corresponding output ports.

By configuring the switching device as above, it is possible to: provide performances of an ideal output-queue switch; store transmission data once in memory banks before outputting; and configure the switching device with different numbers of input ports and output ports.

At this time, the switching device determines the transmission times of the transmission data to prevent input/output port collisions before delivering the transmission data. The switching device using the shared memory bank in accordance with the specific embodiment of the present invention utilizes methods described as below. Method 1: the inputted transmission data are distributed among multiple dispersed shared memory banks which are larger in number than the N number of input ports, so that input port transmission collisions are prevented. Method 2: to prevent transmission collisions to output ports, the transmission data with an identical output port are stored in different output time slots of the shared memory bank, so that the data are not outputted at the same time from the dispersed shared memory banks.

Next, referring to FIGS. 2 to 3, detailed configurations and operations of the above configuration elements are described below.

Also, variables are used in the drawings and the below description, and the variables are defined and described as below for the convenience of description.

S number: input port number $a_{input\_port}$: a transmission data transmitted from an input port $a^{output\_port}$: a transmission data transmitted to an output port $b_{input\_port}^{memory\_bank\_number}$: a transmission data stored in an output time position of a memory bank "memory_bank_number"

Figure 3:
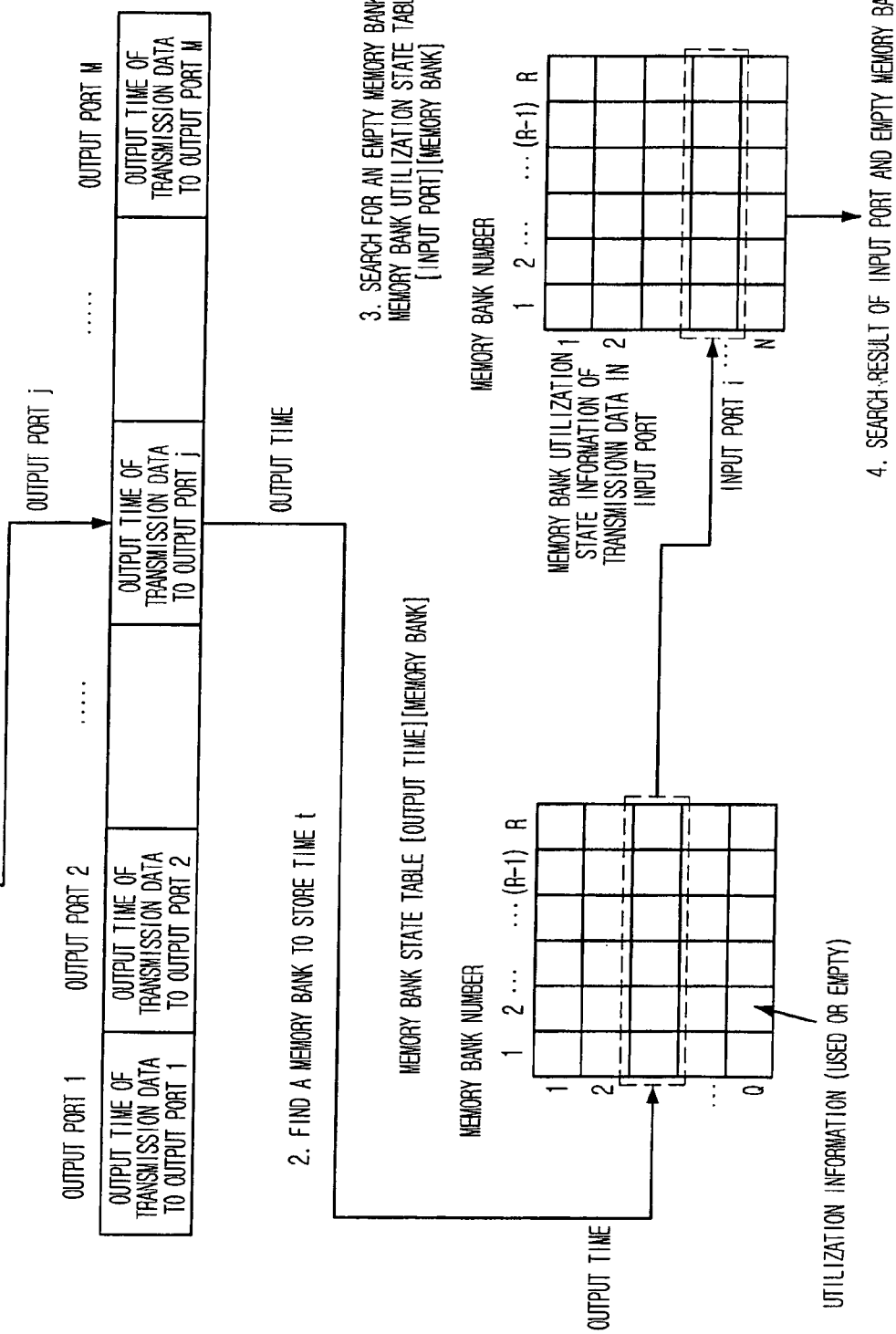
FIG. 3 is a diagram showing an embodiment of operation processes of an output time determination unit and a memory bank selection unit.

$t_{input\_port}$: an output time of the transmission data $a_{input\_port}$ $t_g$: a current output time of a memory bank d number: an output port of a transmission data $b_{tg}^{memory\_bank\_number}$ FIG. 2 is a detailed diagram illustrating internal connections and switching information of a switching device in accordance with a specific embodiment of the present invention, and FIG. 3 is a diagram showing another embodiment of operation processes of an output time determination unit and a memory bank selection unit.

First, an output time determination unit 100 executes functions of: reading output ports of transmission data (cell/packet) inputted by external devices, then delivering output port values and output time request information of the corresponding transmission data to an output time administration unit 150 to determine output times to output ports of the corresponding transmission data, utilizing an accordingly outputted output time $t_{output\text{-}port}$ of the corresponding transmission data from the output time administration 150; and verifying utilization state of memory banks 131 utilizing the output times of the transmission data to the output ports and a current memory bank output time $t_g$.

The output time administration unit 150 receives the output ports and output time request information from the output time determination unit 100 with a plurality of input ports, determines output times of the transmission data to prevent output time collisions for the transmission data heading toward an identical output port, and delivers the determined output times to the output time determination unit 100.

That is, the output time administration unit 150 executes functions of: determining input port service priority for the data heading toward an identical output port by utilizing input port service priority information 510 for each output port, as shown in FIG. 5B; changing the input port service priority information 510 for each output port at every unit time to allow the transmission data of the input port for each output port to receive equitable services; administering possible output times of transmission data 500 for each output, as shown in 5A; and selecting a latter data output time between the determined data output time of the input port and a current output time according to the input port service priority to transmit to the output time determination unit 100.

Subsequently, a memory bank selection unit 110 executes functions of: reading the utilization information of the memory banks which correspond to the data output times of the output time determination unit 100 from a memory bank utilization information administration unit 160 for each of the input ports; combining memory bank utilization information per output time 700, as shown in FIG. 7, for each of the input ports to configure memory bank utilization information per output time 800, as shown in FIG. 8, for the corresponding input port data, then searching and selecting memory banks for each of the input ports so that the memory banks does not collide with each other; and transmitting the selected memory bank and the output time (transmission time) of the input port to the memory bank utilization information administration unit 160 for modifying (renewing) the memory bank utilization information per output time 700.

Furthermore, the memory bank utilization information administration unit 160 executes functions of: administering the memory bank utilization information per output time 700, and receiving the data output times from the memory bank selection unit 110 with a plurality of the input ports to deliver the corresponding memory bank utilization information per output time to the memory bank selection unit 110; and receiving the selected memory bank and the output time (transmission time) of the input port from the memory bank selection unit 110 for modifying (renewing) the corresponding memory bank utilization information per output time 700.

Also, a shared memory bank 130 executes functions of: storing the transmission data in output time positions of the memory banks which are selected and determined by the results of memory bank selection unit 110 and the output time determination unit 100 that are delivered by a connection unit 120; simultaneously reading to output all of the transmission data of the memory banks 131 which correspond to the current output time $t_g$; and assigning and using the first storing position of each memory bank 131 as a storing position which comes next to the last storing position.

Moreover, an output port connection unit 140 executes functions of: receiving inputs of the transmission data corresponding to the current output time from the shared memory bank 130; and selecting and outputting valid transmission data from the inputted transmission data for each of the output ports.

Next, referring to FIGS. 4 to 5B, detailed configurations and operations of the output time determination unit 100 and the output time administration unit 150 are described below.

Figure 4:
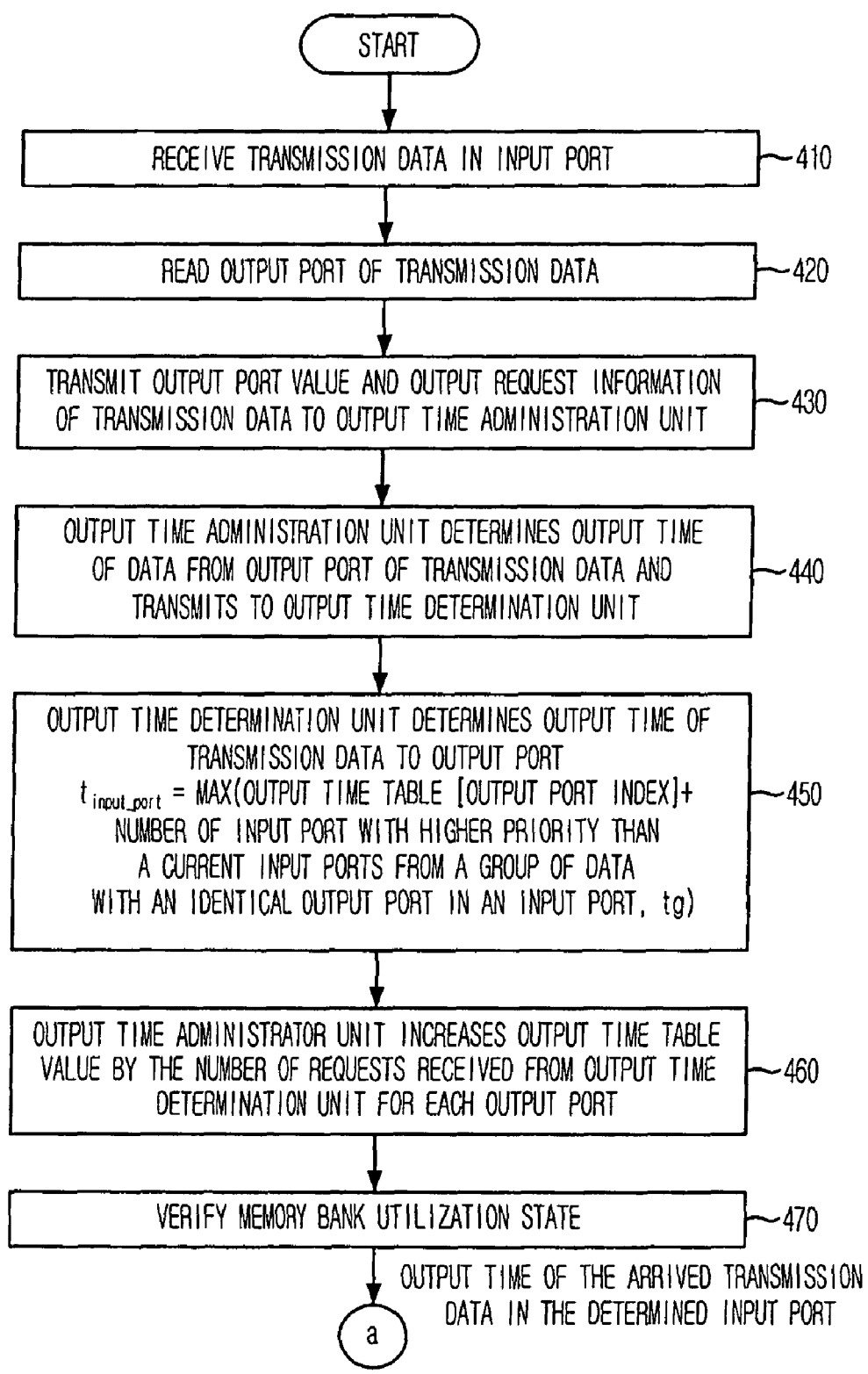
FIG. 4 is a detailed flow-chart illustrating an embodiment of operation processes of an output time determination unit and an output time administration unit for transmission data which arrived in an input port.

FIG. 4 is a detailed flow-chart illustrating an embodiment of operation processes of an output time determination unit 100 and an output time administration unit 150 for transmission data which arrived in an input port, and FIGS. 5A to 5B are diagrams showing embodiments of possible data output time information for each output port of the data used in the output time administration unit 150 for each output port.

Referring to FIG. 4, the output time determination unit 100 receives transmission data from external devices at step 410, reads output ports of the inputted transmission data (cell/packet) at step 420, and then delivers output port values and output time request information of the corresponding transmission data to the output time administration unit 150 at step 430.

Accordingly, the output time administration unit 150 receives the output port values and the output time request information of the transmission data from the output time determination unit 100, determines output times of the transmission data so that the output times of the transmission data heading toward an identical output port do not collide, and delivers the output times to the output time determination unit 100 at step 440.

The output time determination unit 100 adds together the corresponding "transmission data output time table [output port value]" received from the output time administration unit 150, as shown in FIG. 5A, and "the number of input ports with higher priority than the current input port from a group of data with an identical output port in an input port", and determines the added value as an output time for a current data at step 450. If this output time is earlier than a current output time $t_g$, the transmission time is already late, and therefore the current output time $t_g$ is used as the output time for the fastest transmission possible. The output time ($t_{input\_port}$) to an output port of the corresponding data in an input port can be calculated as the equation (1) below:

$$t_{input\_port} = \max(\text{output time table [output port index]} + \text{number of input ports with higher priority than the current input port from a group of data with an identical output port in an input port}, t_g)$$

The priority information for the input ports of each output port, as shown in FIG. 5B, is utilized to provide equitable chances to the input ports of each output port. The "input port service priority information from each output port [output port index]" which is used to determine the input port service priority for the data heading toward an identical output port, is modified at every unit time.

Also, the output time administration unit 150 increases the value of the output time table by the number of requests received from the output time determination unit 100 for each output port at step 460. The step 460 can be executed right after the step 440 or the step 470.

Furthermore, the output time determination unit 100 examines and verifies utilization state of the memory banks 131 by using the output time to an output port for the transmission data and the current memory bank output time $t_g$.

As described above, the output time determination unit 100 determines an output time to an output port for inputted transmission data 1210 and delivers the output time to a memory bank selection unit 110. Herein, the output time determination unit 100 determines the output times for the inputted transmission data through a plurality of input ports to prevent output time collisions of the transmission data heading toward an identical output port. Also, the output time determination unit 100 for each input port shares the information of the output time administration unit 150, and the output time administration unit 150 administers the output time (output transmission time) for each switch output port 500 and the input port service priority information for each output port 510. The output time determination unit 100 determines the input port service order for the data heading toward an identical output port by utilizing the input port service priority information 510, and modifies the input port priority information 510 for each output port at every unit time so that the input port data for each output port can receive equitable services. If the calculated output time of the transmission data is earlier than a current output time, the latter output time between the input port data output time and the current output time is used as the data output time for the fastest transmission possible. A difference between the transmission data output time and the current data transmission time (memory bank output time $t_g$) is verified for memory over flows. If there is a memory overflow, the transmission data may not be inserted into the memory banks.

Next, referring to FIGS. 6 to 8, detailed configurations and operations of the memory bank selection unit 110 and the memory bank utilization information administration unit 160 are described below.

Figure 6:
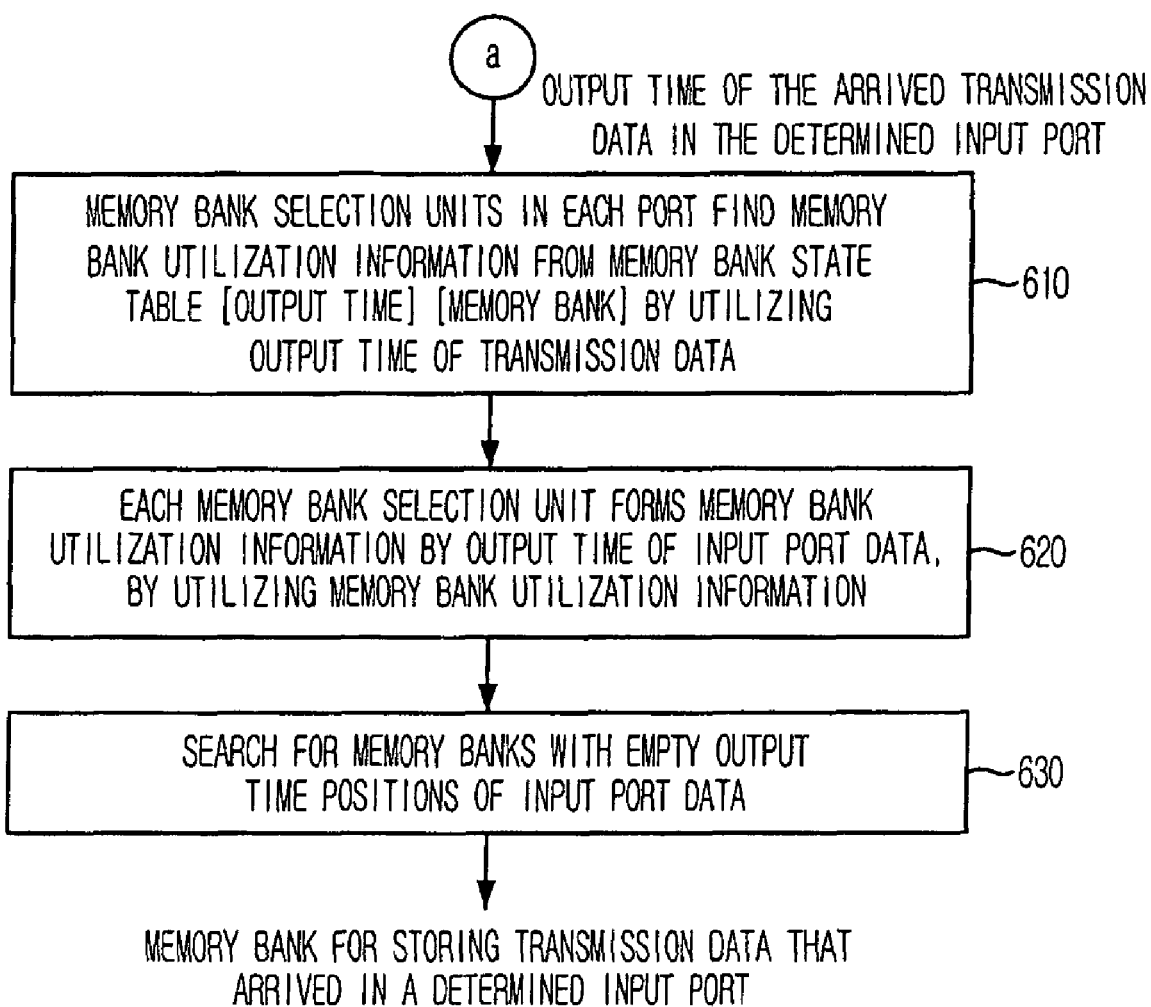
FIG. 6 is a detailed flow-chart illustrating an embodiment of operation processes of a memory bank selection unit and a memory bank utilization information administration unit for transmission data which arrived in an input port.

FIG. 6 is a detailed flow-chart illustrating an embodiment of operation processes of a memory bank selection unit 110 and a memory bank utilization information administration unit 160 for transmission data which arrives in an input port, FIG. 7 is a diagram showing an embodied memory bank state table providing memory banks and utilization information per output time of a shared memory bank which is used in the memory bank utilization information administration unit 160, and FIG. 8 is a diagram showing an embodiment of memory bank utilization information per output time for input port data which are used in the memory bank selection unit 110.

Referring to FIG. 6, the memory selection unit 110 for each input port reads utilization information of memory banks 700 which correspond to the data output time of the output time determination unit 100, from the memory bank state table [output time][memory bank] of the memory bank utilization information administration unit 160. Herein, the memory bank utilization information administration unit 160 administers the utilization information of the memory banks per output time 700 until the data output time arrives from the memory bank selection unit 110, and then delivers the corresponding memory bank utilization information per output time to the memory bank selection unit 110.

Then, the memory bank selection unit 110 combines the memory bank utilization information per output time 700 together for each input port to configure memory bank utilization information per output time 800 for the corresponding input port data 620, and then searches and selects memory banks with empty output time positions of the input port data 630.

Furthermore, the memory bank selection unit 110 transmits the selected memory bank and the output time (transmission time) of the input port to the memory bank utilization information administration unit 160 to modify the memory bank utilization information per output time 700, and accordingly, the memory bank utilization information administration unit 160 modifies the corresponding memory bank utilization information per output time 700.

As described above, the memory bank selection unit 110 executes a process of selecting the memory banks with empty data output time positions by utilizing the data output time which is the result of the output time determination unit 100, and the memory bank utilization information administration unit 160 administers the memory bank utilization information per output time 700. Also, the memory bank selection unit 110 for each input port reads the memory bank utilization information 700 which correspond to the determined data output time of the output time determination unit 100, and configures the memory bank utilization information per output time for the input port data 800. Then, the memory bank selection unit 110 for each input port utilizes the memory bank utilization information per output time to search the memory banks for each input port so that the transmission data in each input port can be corresponded to memory banks which do not overlap with each other, as shown in FIG. 3. In this search step, pairs of a memory bank and an input port which do not overlap with each other are found in the memory bank utilization information per output time for the input port data 800. Then, the memory bank selection unit 110 utilizes the above search result to determine the memory banks 131 wherein the input port transmission data are to be stored. The memory bank utilization information administration unit 160 receives the memory banks of the transmission data output time and the output time information $t_g$ which are determined (utilized) in accordance with the above search results, and modifies the memory bank utilization information 700.

Figure 9A:
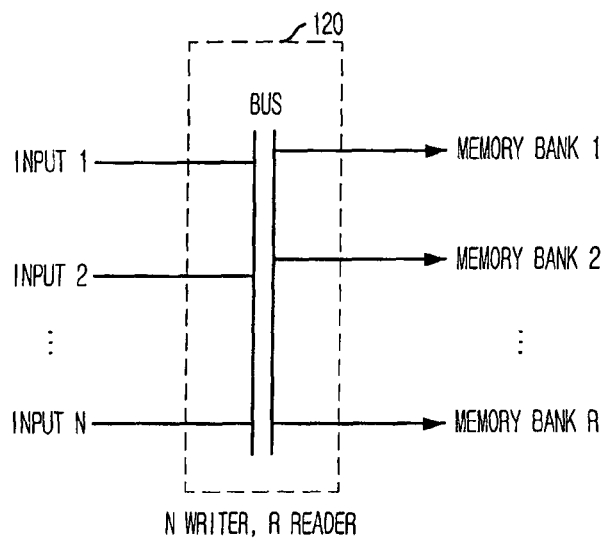
FIG. 9A is a detailed diagram showing an embodied connection unit for connecting a memory bank selection unit and a shared memory bank.
Figure 9B:
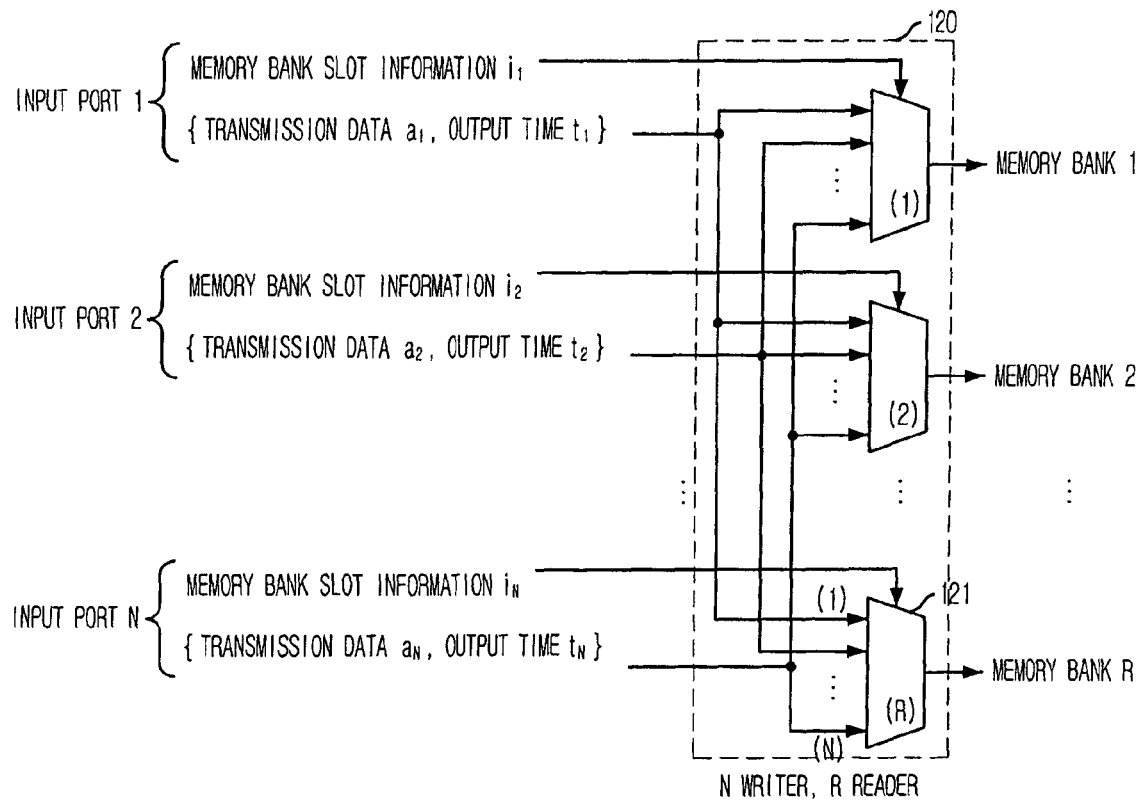
FIG. 9B is a detailed diagram showing another embodied connection unit for connecting a memory bank selection unit and a shared memory bank.

FIG. 9A is a detailed diagram showing an embodied connection unit 120 for connecting a memory bank selection unit 110 and a shared memory bank 130 utilizing a bus, and FIG. 9B is a detailed diagram showing another embodied connection unit 120 for connecting a memory bank selection unit 110 and a shared memory bank 130 utilizing memory bank output selectors 121.

As shown in FIGS. 9A to 9B, the connection unit 120 delivers data to output time positions of memory banks 131 which are selected by results of an output time determination unit 100 and the memory bank selection unit 110. At this point, each of the memory bank output selectors 121 in FIG. 9B delivers inputted transmission data and output times to output time positions of corresponding memory banks in accordance with each memory bank position information (slot information).

FIG. 10 is a detailed diagram showing embodiments of an entire shared memory bank 130 and an individual memory bank 131.

Referring to FIG. 10, transmission data inputted from input ports are distributed among a plurality of the memory banks 131, allowing the transmission data to be delivered immediately to the multiple shared memory banks 130 and be stored without a need for queuing at the input ports. The data which are simultaneously inputted into N number of input ports can be stored in N number of the distributed shared memory banks 130. However, when the transmission data are concentrated in certain ports regarding a non-uniform distribution traffic, a sufficient number of the distributed shared memory banks 130 which are larger than the input ports in number are utilized to reduce memory bank search complexity. This embodiment of the present invention provides identical performances of an output-queue switch device by utilizing 2N or less number of the memory banks (R unit) 131.

The shared memory bank 130 executes a function of storing the transmission data according to an output time $t_{input\_port}$ of a selected memory bank. Herein, the transmission data, the output times of the transmission data and memory bank position information wherein the transmission data is to be stored are delivered through a memory bank selection unit 110 and a connection unit 120. Herein, a memory bank 131 from the shared memory bank 130 is selected for storing the data according to the memory bank position information wherein the transmission data is to be stored, and a storing position in the memory bank 131 is determined by the data output time $t_{input\_port}$. In this embodiment of the present invention, the shared memory bank 130 administers a current output time $t_g$ which transmits current data, and all of the memory banks 131 of the shared memory bank 130 simultaneously read the data corresponding to the current output time $t_g$ and output the data to an output port connection unit 140. The data stored in the memory banks are assumed as fixed-length data, and transmission data with various lengths can be processed by utilizing data division and re-assembling processes.

Figure 11A:
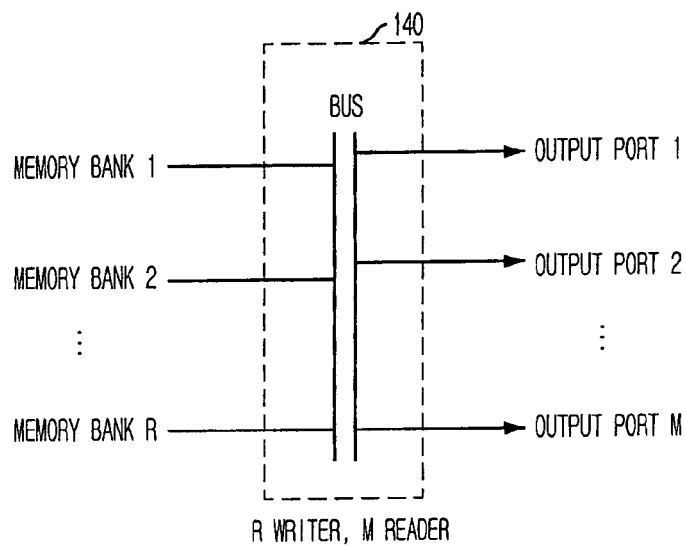
FIG. 11A is a detailed diagram showing an embodied output port connection unit.
Figure 11B:
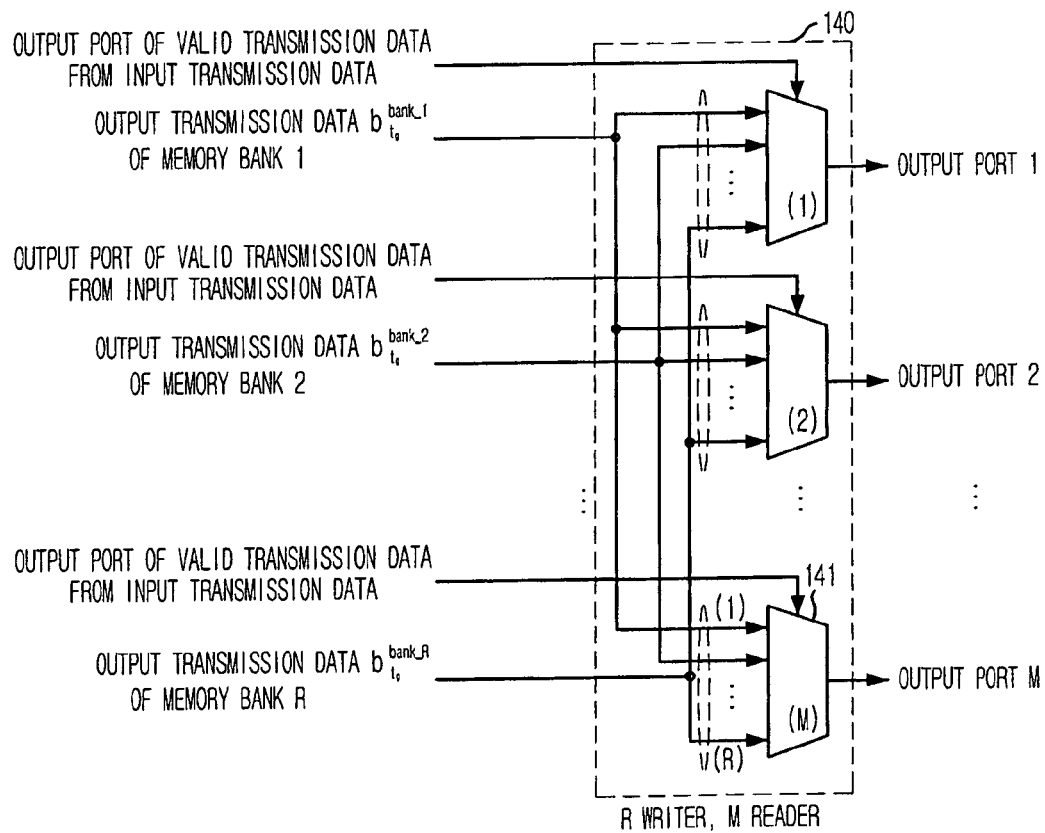
FIG. 11B is a detailed diagram showing another embodied output port connection unit.

FIG. 11A is a detailed diagram showing an embodied output port connection unit 140 utilizing a bus, and FIG. 11B is a detailed diagram showing another embodied output port connection unit 140 utilizing memory bank selectors 141.

Referring to FIGS. 11A to 11B, the output port connection unit 140 executes functions of simultaneously receiving output data corresponding to a current output time $t_g$ in a shared memory bank 130 and transmitting the output data to output ports of each data. At this time, an output port of the output port connection unit 140 transmits only one or less transmission data out of the transmission data inputted from a plurality of memory banks 131. That is, the transmission data heading toward an identical output port are each stored at different times, so that there is no output port collision for the transmission data outputted from the dispersed shared memory banks 130 in this specific embodiment of the present invention, having one or less transmission data being transmitted to one output port.

Also, the memory bank output selectors 141 of FIG. 11B deliver each of the inputted transmission data to the corresponding output ports according to each of the "output port of valid transmission data from input transmission data" information.

FIG. 12 is a diagram showing an entire operation process of a switching device in accordance with an embodiment of the present invention.

As shown in FIG. 12, the embodiment inputted each transmission data $a_{s1}$, $a_{s2}$ and $a_{s3}$ through input ports 1, 2 and 3, and assumed that an output port $d_{s1}$ of the transmission data 1=2, an output port $d_{s2}$ of the transmission data 2=3 and an output port $d_{s3}$ of the transmission data 3=1. An output time determination unit 100 in each of the input ports reads the output ports of the inputted transmission data ($d_{s1}$=2, $d_{s2}$=3 and $d_{s3}$=1) in the input ports, and reads data output times (an output time of the $a_{s1}$ data=output time table $[d_{s1}=2]=1$, an output time of the $a_{s2}$ data=output time table $[d_{s2}=3]=1$, an output time of the $a_{s3}$ data=output time table $[d_{s3}=1]=1$) corresponding to the output ports ($d_{s1}$=2, $d_{s2}$=3 and $d_{s3}$=1) from an output administration unit 150. The output time determination unit 100 administers priority information of the input ports and the output port information of the transmission data ($d_{s1}$=2, $d_{s2}$=3 and $d_{s3}$=1). The priority information of the input ports for each of the output ports are utilized to provide equitable chances to the input ports. The input port service priority for each of the output ports is modified at every unit time.

Each of the output time determination unit 100 determines an output time of a current data by adding the values of "transmission data output time table [output port value]" (refer to FIG. 5A) and "number of input ports with higher priority than a current input port from a group of data with an identical output port in an input port." If the output time is earlier than a current output time $t_g$, the transmission time is already late, so the current output time $t_g$ is used as the data output time for the fastest transmission possible. The output time $t_{input\_port}$ to an output port of the corresponding transmission data in an input port can be calculated by mathematical equations below:

$$t_{s1} = \max(\text{output time table}[d_{s1}=2]+0, t_g) = \max(1+0,1) = 1$$

$$t_{s2} = \max(\text{output time table}[d_{s2}=3]+0, t_g) = \max(1+0,1) = 1$$

$$t_{s3} = \max(\text{output time table}[d_{s3}=1]+0, t_g) = \max(1+0,1) = 1$$

Herein, the output time administration unit 150 increases the output time table values by the number of requests received from each output time determination unit 100. In FIG. 12, requests of the output ports 1, 2 and 3 are all one, so the values of the output time table [1], the output time table [2] and the output time table [3] increase from 1 to 2.

Also, when storing the transmission data in a shared memory bank 130, verification for a memory overflow is executed. If there is no memory overflow, the transmission data $a_{s1}$, $a_{s2}$ and $a_{s3}$ and data output times $t_{s1}$=1, $t_{s2}$=1 and $t_{s3}$=1 information are delivered to a memory bank selection unit 110.

Then, the memory bank selection unit 110 selects a memory bank for the data to be stored by utilizing the inputted transmission data $a_{s1}$, $a_{s2}$ and $a_{s3}$ and data output times $t_{s1}$=1, $t_{s2}$=1 and $t_{s3}$=1.

As shown in FIG. 3, the memory bank selection unit 110 executes a process as described below to select the memory bank for the data. The embodiment in FIG. 12 assumed that all of the memory banks are empty.

The memory bank selection unit 110 searches for memory bank utilization state information per output time of the data in each of the input ports (refer to FIG. 8) from memory bank utilization state [output time] [memory bank] per output time information (refer to FIG. 7) by utilizing the transmission data output times $t_{s1}=1$, $t_{s2}=1$ and $t_{s3}=1$ in the input ports (refer to FIG. 3). Pairs of {input port, memory bank} which do not overlap with each other are found by utilizing memory bank utilization state [input port] [memory bank] information for each of the input ports. In this specific embodiment, it is assumed that a memory bank $i_{s1}$ where the data $a_{s1}$ of the input port 1 is to be stored=1, a memory bank is 2 where the data $a_{s2}$ of the input port 2 is to be stored=2 and a memory bank is 3 where the data $a_{s3}$ of the input port 3 is to be stored=3. Results of newly selected pairs {input port, memory bank} are modified, reflecting the memory bank utilization state [output time] [memory bank] per output time information. The memory bank selection unit 110 outputs the memory banks $i_{s1}=1$, $i_{s2}=2$ and $i_{s3}=3$ where the data are to be stored in.

A connection unit 120 receives the memory banks $i_{s1}=1$, $i_{s2}=2$ and $i_{s3}=3$ where the output times $t_{s1}=1$, $t_{s2}=1$ and $t_{s3=1}$ of the transmission data $a_{s1}$, $a_{s2}$ and $a_{s3}$ are to be stored, and stores the data in the shared memory bank 130.

According to the determination and the selection above, the transmission data $a_{s1}$ is stored in the output time $t_{s1}=1$ position of the memory bank $i_{s1}=1$ through the connection unit 120, the transmission data $a_{s2}$ is stored in the output time $t_{s2}=1$ position of the memory bank $i_{s2}=2$ through the connection unit 120 and the transmission data $a_{s3}$ is stored in the output time $t_{s3}=1$ position of the memory bank $i_{s3}=3$ through the connection unit 120.

Subsequently, as the current output time $t_g$ becomes "1", the data ($a_{s1}$, $a_{s2}$ and $a_{s3}$) stored in the memory banks 1, 2 and 3 which correspond to the output time $t_g=1$ and the output ports $d_{s1}=2$, $d_{s2}=3$ and $d_{s3}=1$ information of each data are simultaneously outputted to an output port connection unit 140.

Then, the output port connection unit 140 outputs the transmission data $a_{s1}$ outputted from the memory bank 1 to the output port $d_{s1}=2$, the transmission data $a_{s2}$ outputted from the memory bank 2 to the output port $d_{s2}=3$ and the transmission data $a_{s3}$ outputted from the memory bank 3 to the output port $d_{s3}=1$.

Figure 13:
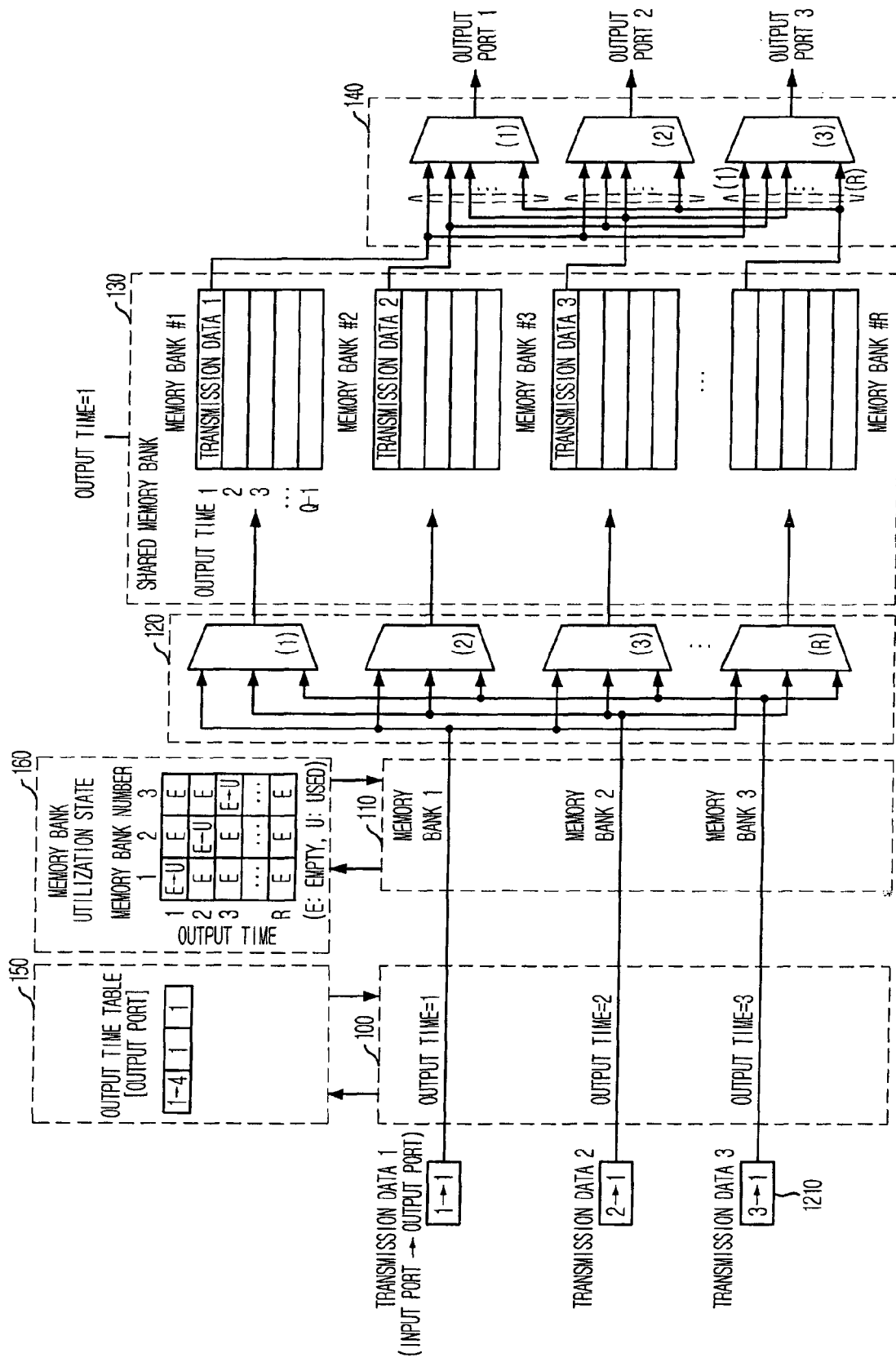
FIG. 13 is another diagram showing an entire operation process of a switching device in accordance with another embodiment of the present invention.

FIG. 13 is a diagram showing an entire operation process of a switching device in accordance with another embodiment of the present invention.

As shown in FIG. 13, the embodiment inputted each transmission data $a_{s1}$, $a_{s2}$ and $a_{s3}$ through input ports 1, 2 and 3, and assumed that an output port $d_{s1}$ of the transmission data 1=1, an output port $d_{s2}$ of the transmission data 2=1 and an output port $d_{s3}$ of the transmission data 3=1. An output time determination unit 100 in each of the input ports reads the output ports of the inputted transmission data ($d_{s1}=1$, $d_{s2}=1$ and $d_{s3}=1$) in the input ports, and reads data output times (an output time of the $a_{s1}$ data=output time table [$d_{s1}=1$]=1, an output time of the $a_{s2}$ data=output time table [$d_{s2}=1$]=1, an output time of the $a_{s3}$ data=output time table [$d_{s3}=1$]=1) corresponding to the output ports ($d_{s1}=1$, $d_{s2}=1$ and $d_{s3}=1$) from an output administration unit 150. The output time determination unit 100 administers priority information of the input ports and the output port information of the transmission data ($d_{s1}=1$, $d_{s2}=1$ and $d_{s3}=1$). The priority information of the input ports for each of the output ports are administered and utilized to provide equitable chances to the input ports toward each output port. The input port service priority for each of the output ports is modified at every unit time.

In this embodiment in FIG. 13, all of the inputted transmission data are transmitted to the output port 1, so the output ports of the transmission data are all the same. If it is assumed that input port priority in the output port 1 is input port 1>input port 2>input port 3, the transmission data $a_{s1}$ of the input port 1 has the highest priority because all transmission data are heading toward the output port 1. The transmission data $a_{s2}$ of the input port 2 also heads toward the identical output port, and the input port with high priority becomes s1. The transmission data $a_{s3}$ of the input port 3 also heads toward the identical output port, and the input ports with high priority becomes s1 and s2. The number of input ports with higher priority than the current input port is 0 within the data with the same output port in the transmission data $a_{s1}$ of the input port 1. The number of input ports with higher priority than the current input port is 1 (the input port 1) within the data with the same output port in the transmission data $a_{s2}$ of the input port 2. The number of input ports with higher priority than the current input port is 2 (the input ports 1 and 2) within the data with the same output port in the transmission data $a_{s3}$ of the input port 3.

Each of the above output time determination unit 100 determines an output time of a current data by adding the values of corresponding "transmission data output time table [output port value]" (refer to FIG. 5A) which was delivered from the above output time administration unit 150 and "number of input ports with higher priority than a current input port from a group of data with an identical output port in an input port." If the output time is earlier than a current output time $t_g$, the transmission time is already late, so the current output time $t_g$ is used as the data output time for the fastest transmission possible. The output time ($t_{input\_port}$) to an output port of the corresponding transmission data in an input port can be calculated by mathematical equations below:

$$t_{s1}=\max(\text{output time table}[d_{s1}=1]+0, t_g)=\max(1+0,1)=1$$

$$t_{s2}=\max(\text{output time table}[d_{s2}=1]+1(\text{input port } s1), t_g)=\max(1+1,1)=2$$

$$t_{s3}=\max(\text{output time table}[d_{s3}=1]+2(\text{input ports } s1 \text{ and } s2), t_g)=\max(1+2,1)=3$$

Herein, the output time administration unit 150 increases the output time table values by the number of requests received from each output time determination unit 100. (In FIG. 13, there are three requests to the output port 1, so the value of the output time table [1] increases from 1 to 4).

Furthermore, when storing the transmission data in a shared memory bank 130, verification for a memory overflow is executed. If there is no memory overflow, the transmission data $a_{s1}$, $a_{s2}$ and $a_{s3}$ and data output times $t_{s1}=1$, $t_{s2}=2$ and $t_{s3}=3$ information are delivered to a memory bank selection unit 110.

Then, the memory bank selection unit 110 selects a memory bank for the data to be stored by utilizing the inputted transmission data $a_{s1}$, $a_{s2}$ and $a_{s3}$ and data output times $t_{s1}=1$, $t_{s2}=2$ and $t_{s3}=3$.

As shown in FIG. 3, the memory bank selection unit 110 executes a process as described below to select the memory bank for the data. The embodiment in FIG. 13 assumed that all of the memory banks are empty.

The memory bank selection unit 110 searches for memory bank utilization state information per output time of the data in each of the input ports (refer to FIG. 8) from memory bank utilization state [output time] [memory bank] per output time information (refer to FIG. 7) by utilizing the transmission data output times $t_{s1}=1$, $t_{s2}=2$ and $t_{s3}=3$ in the input ports (refer to FIG. 3). Pairs of {input port, memory bank} which do not overlap with each other are found by utilizing memory bank utilization state [input port] [memory bank] information for each of the input ports. In this specific embodiment, it is assumed that a memory bank $i_{s1}$ where the data $a_{s1}$ of the input port 1 is to be stored=1, a memory bank is 2 where the data $a_{s2}$ of the input port 2 is to be stored=2 and a memory bank $i_{s3}$ where the data $a_{s3}$ of the input port 3 is to be stored=3. Results of newly selected pairs {input port, memory bank} are modified, reflecting the memory bank utilization state [output time] [memory bank] per output time information. The memory bank selection unit 110 outputs the memory banks $i_{s1}=1$, $i_{s2}=2$ and $i_{s3}=3$ where the data are to be stored in.

A connection unit 120 receives the memory banks $i_{s1}=1$, $i_{s2}=2$ and $i_{s3}=3$ where the output times $t_{s1}=1$, $t_{s2}=2$ and $t_{s3}=3$ of the transmission data $a_{s1}$, $a_{s2}$ and $a_{s3}$ are to be stored, and stores the data in the shared memory bank 130.

According to the determination and the selection above, the transmission data $a_{s1}$ is stored in the output time $t_{s1}=1$ position of the memory bank $i_{s1}=1$ through the connection unit 120, the transmission data $a_{s2}$ is stored in the output time $t_{s2}=2$ position of the memory bank $i_{s2}=2$ through the connection unit 120 and the transmission data $a_{s3}$ is stored in the output time $t_{s3}=3$ position of the memory bank $i_{s3}=3$ through the connection unit 120.

Subsequently, as the current output time $t_g$ becomes "1", the data $a_{s1}$ stored in the memory banks 1, 2 and 3 which correspond to the output time $t_g=1$ and the output port $d_{s1}=1$ information of the corresponding data are outputted to an output port connection unit 140. Then, the output port connection unit 140 outputs the transmission data $a_{s1}$ outputted from the memory bank 1 to the output port $d_{s1}=1$.

Afterwards, as the current output time $t_g$ becomes "2", the data $a_{s2}$ stored in the memory banks 1, 2 and 3 which correspond to the output time $t_g=2$ and the output port $d_{s2}=1$ information of the corresponding data are outputted to an output port connection unit 140. Then, the output port connection unit 140 outputs the transmission data $a_{s2}$ outputted from the memory bank 1 to the output port $d_{s2}=1$.

Furthermore, as the current output time $t_g$ becomes "3", the data $a_{s3}$ stored in the memory banks 1, 2 and 3 which correspond to the output time $t_g=3$ and the output port $d_{s3}=1$ information of the corresponding data are outputted to an output port connection unit 140. Then, the output port connection unit 140 outputs the transmission data $a_{s3}$ outputted from the memory bank 1 to the output port $d_{s3}=1$.

In accordance with the specific embodiment of the present invention, the switching device can execute effective switching functions utilizing multiple shared memory banks in systems such as a switching system. That is, the specific embodiment of the present invention shares sharing multiple memory banks to enable easy expansion, reduces power consumption by storing the data once in the memory banks before outputting, and provides identical performances as an output-queue switch structure regarding uniform distribution traffic and non-uniform distribution traffic.

More detailed effects of the specific embodiment of the present invention are as below:

First, the specific embodiment of the present invention provides identical performances as an output-queue switch structure regarding uniform distribution traffic as well as non-uniform distribution traffic.

Second, when an input port capacity is assumed as 'R', it is possible to design transmission speed of transmission data as 'R' in all channels in accordance with this specific embodiment of the present invention.

Third, the specific embodiment of the present invention can be realized by utilizing memory banks each with bandwidth of 'R'. Herein, the bandwidth is used in reading and writing of dispersed shared memory banks.

Fourth, the specific embodiment of the present invention has advantages of having transmission data dispersed in a plurality of channels by utilizing multiple memory banks, then combining the data for outputting, as well as maintaining a transmission order of the transmission data dispersed in the plurality of channels.

Fifth, the data are stored once in the dispersed shared memory banks before outputting, resulting in a shorter latency period through the switch. Thus, there is another advantage of having smaller memory bank capacity than other switch structures of same capacity in the specific embodiment of the present invention.

Sixth, various configurations are possible even when numbers of input ports and output ports are different in the specific embodiment of the present invention.

The present application contains subject matter related to the Korean patent application No. KR 2005-21413, filed in the Korean Patent Office on Mar. 15, 2005, the entire contents of which being incorporated herein by reference.

While the present invention has been described with respect to certain specific embodiments, it will be apparent to those skilled in the art that various changes and modifications may be made without departing from the spirit and scope of the invention as defined in the following claims.

What is claimed is:

1. A switching device for delivering data from a plurality of input ports to a plurality of output ports, comprising:
    an output time determination unit to determine an output time to an output port by reading output port information of the data inputted from an external device;
    an output time administration unit, which is connected to the output time determination unit, to administer an output time of possible data for each output port of the data;
    a memory bank selection unit to select a memory bank with an empty data output time position by utilizing the output time from the output time determination unit;
    a memory bank utilization information administration unit, which is connected to the memory bank selection unit, to administer utilization information per output time of the memory bank;
    a connection unit to deliver data to a data output time position of the memory bank, which is selected and determined by results of the output time determination unit and the memory bank selection unit;
    a shared memory unit, which is connected to the connection unit, to store the data in the data output time position of the memory bank selected and determined by results of the output time determination unit and the memory bank selection unit, to administer a plurality of dispersed shared memory banks according to an output time, to read and output the data which correspond to a current output time; and
    an output port connection unit receiving the data which correspond to the current output time of the shared memory unit to read the output port information of the data and transmit the data to a corresponding output port.

2. The switching device of claim 1, wherein the shared memory unit is structured to divide and store the data in the plurality of dispersed shared memory banks, and the number of the dispersed shared memory banks is larger than the input ports in number to prevent input port transmission collisions.

3. The switching device of claim 2, wherein the dispersed shared memory banks:
   store the data in the data output time position of the memory bank which is selected and determined by the results of the output time determination unit and the memory bank selection unit received through the connection unit;
   read the data of every memory bank corresponding to the current output time to output simultaneously; and
   assign and uses a first storing position of each memory bank as a storing position which comes next to a last storing position.

4. The switching device of claim 3, wherein the output time determination unit:
   reads the output port of data inputted from the external device;
   transmits an output port value and an output time request information of the data to the output time administration unit;
   determines an output time to the output port of the data by utilizing the output time of the data, which is accordingly outputted from the output time administration unit; and
   verifies utilization state of the memory bank by utilizing the output time of the data to the output port and a current memory bank output time.

5. The switching device of claim 3, wherein the output time administration unit:
   receives the output port and an output time request information of the data from the output time determination unit;
   determines the output times of the data, so that the output times of the data heading toward an identical output port do not overlap with each other; and
   transmits the determined output times to the output time determination unit.

6. The switching device of claim 5, wherein the output time administration unit:
   determines an order of input port services for the data heading toward the identical output port by utilizing input port service priority information for the each output port;
   changes the input port service priority information for the each output port at every unit time to allow the data of the input port for the each output port to receive equitable services;
   administers output times of the possible data per the each output port; and
   selects a latter output time between the determined output time of the input port and the current output time according to the input port service priority for a transmission to the output time determination unit.

7. The switching device of claim 3, wherein the memory bank selection unit:
   reads memory bank utilization information corresponding to the output times of the output time determination unit from the memory bank utilization information administration unit for each input port;
   combines the memory bank utilization information per output time for each of the input ports to configure the memory bank utilization information per output time of the data in the corresponding input port;
   searches and selects a memory bank for each of the input ports to prevent overlapping memory banks; and
   transmits the selected memory bank and the output time of the input port to the memory bank utilization information administration unit to modify the utilization information of the memory bank per output time.

8. The switching device of claim 7, wherein the memory bank utilization information administration unit:
   administers the memory bank utilization information per output time;
   receives the output time from the memory bank selection unit and delivers the corresponding memory bank utilization information per output time to the memory bank selection unit; and
   receives the selected memory bank and the output time of the input port from the memory bank selection unit to modify the corresponding memory bank utilization information per output time.

9. The switching device of claim 3, wherein the output port connection unit receives the data corresponding to the current output time from the shared memory unit, and selects and outputs a valid data from the received data for each output port.

10. The switching device of claim 1, wherein the output time determination unit: transmits an output port value and an output time request information of the data to the output time administration unit;
   determine an output time to the output port of the data by utilizing the output time of the data which is accordingly outputted from the output time administration unit; and
   verify a utilization state of the memory bank by utilizing the output time of the data to the output port and a current memory bank output time.

11. The switching device of claim 1, wherein the output time administration unit:
   receives the output port and an output time request information of the data from the output time determination unit;
   determines the output times of the data, so that the output times of the data heading toward an identical output port do not overlap with each other; and
   transmits the determined output times to the output time determination unit.

12. The switching device of claim 11, wherein the output time administration unit:
   determines an order of input port services for the data heading toward the identical output port by utilizing input port service priority information for the each output port;
   changes the input port service priority information for the each output port at every unit time to allow the data of the input port for the each output port to receive equitable services;
   administers output times of the possible data per each output port; and
   selects a latter output time between the determined output time of the input port and the current output time according to the input port service priority for a transmission to the output time determination unit.

13. The switching device of claim 1, wherein the memory bank selection unit:
   reads memory bank utilization information corresponding to the output times of the output time determination unit from the memory bank utilization information administration unit for each input port;
   combines the memory bank utilization information per output time for each of the input ports to configure the memory bank utilization information per output time of the data in the corresponding input port;

searches and selects a memory bank for each of the input ports to prevent overlapping memory banks; and transmits the selected memory bank and the output time of the input port to the memory bank utilization information administration unit to modify the utilization information of the memory bank per output time.

14. The switching device of claim 13, wherein the memory bank utilization information administration unit:

administers the memory bank utilization information per output time;

receives the output time from the memory bank selection unit and delivers the corresponding memory bank utilization information per output time to the memory bank selection unit; and receives the selected memory bank and the output time of the input port from the memory bank selection unit to modify the corresponding memory bank utilization information per output time.

15. The switching device of claim 1, wherein the output port connection unit receives the data corresponding to the current output time from the shared memory unit, and selects and outputs a valid data from the received data for each output port.

* * * * *